United States Patent [19]

Okayama et al.

[11] Patent Number: 5,045,939
[45] Date of Patent: Sep. 3, 1991

[54] APPARATUS UTILIZING MOTION DETECTOR FOR CONVERTING A MAXIMUM MOTION PORTION OF A WIDE SCREEN TV SIGNAL TO A NORMAL SCREEN TV SIGNAL

[75] Inventors: Mutsuyuki Okayama, Kobe; Atsuo Ochi, Moriguchi; Akihiro Takeuchi, Ikoma, all of Japan

[73] Assignee: Matsushita Electric Industrial Co., Ltd., Osaka, Japan

[21] Appl. No.: 549,062

[22] Filed: Jul. 6, 1990

[30] Foreign Application Priority Data

Jul. 6, 1989 [JP] Japan .................................. 1-174722

[51] Int. Cl.⁵ .............................................. H04N 7/01
[52] U.S. Cl. ........................................ 358/140; 358/11
[58] Field of Search ................... 358/11, 12, 140, 105, 358/54, 214, 230

[56] References Cited

U.S. PATENT DOCUMENTS 4,953,025 8/1990 Saitoh et al. ...................... 358/230

FOREIGN PATENT DOCUMENTS 0144693 8/1984 European Pat. Off. .

OTHER PUBLICATIONS

"Television Technology", Published in Japan, Oct. 1989, pp. 42 and 43.

Primary Examiner—James J. Groody
Assistant Examiner—Kim Yen Vu
Attorney, Agent, or Firm—Wenderoth, Lind & Ponack

[57] ABSTRACT

An apparatus for converting a wide screen television signal to a desired normal screen television signal includes an extraction circuit for selectively extracting a portion of the wide screen television signal corresponding to a normal screen television picture to obtain the desired normal television signal, a motion detector for detecting a motion of a picture produced by the wide screen television signal, and a control circuit for controlling the extracting circuit to extract the portion of the wide screen television signal according to a motion detection result of the motion detector. A plurality of candidate areas to be extracted from the wide screen television picture are predetermined. The motion detector detects from among the plurality areas an area in which the motion of the picture is the largest. The control circuit controls the extracting circuit to extract a portion of the wide screen television signal corresponding to the area in which the motion of the picture is the largest.

3 Claims, 5 Drawing Sheets

FIG. 3
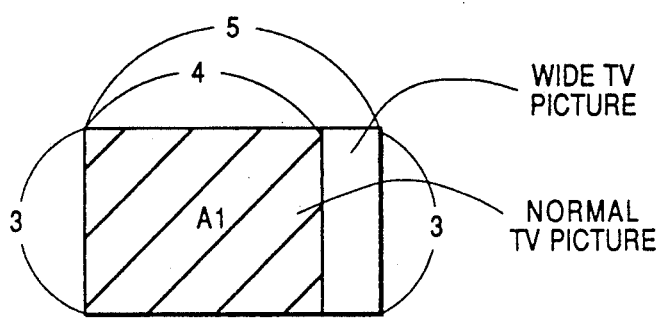
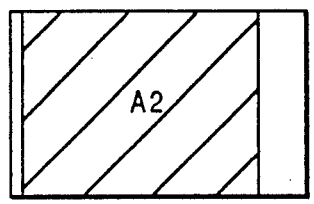
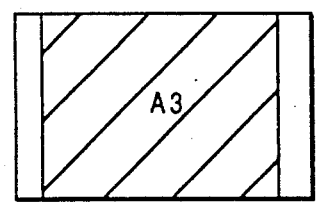
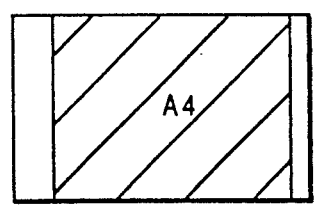
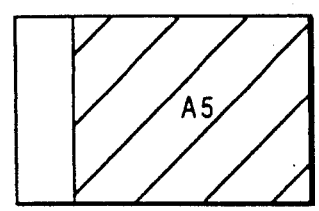
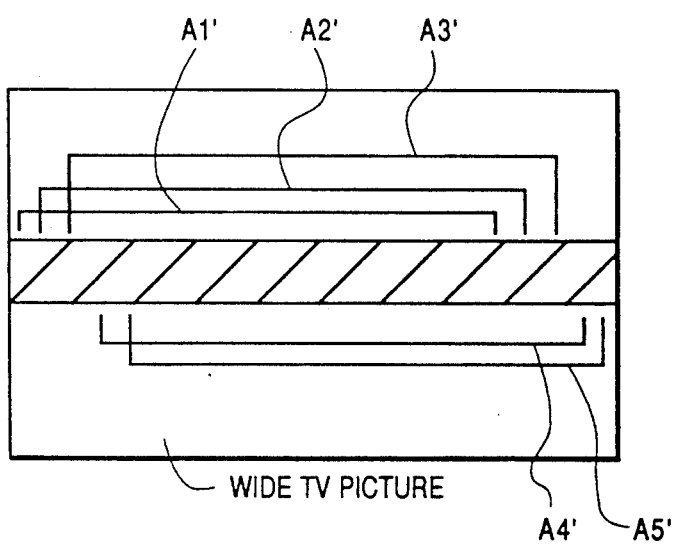
FIG. 6

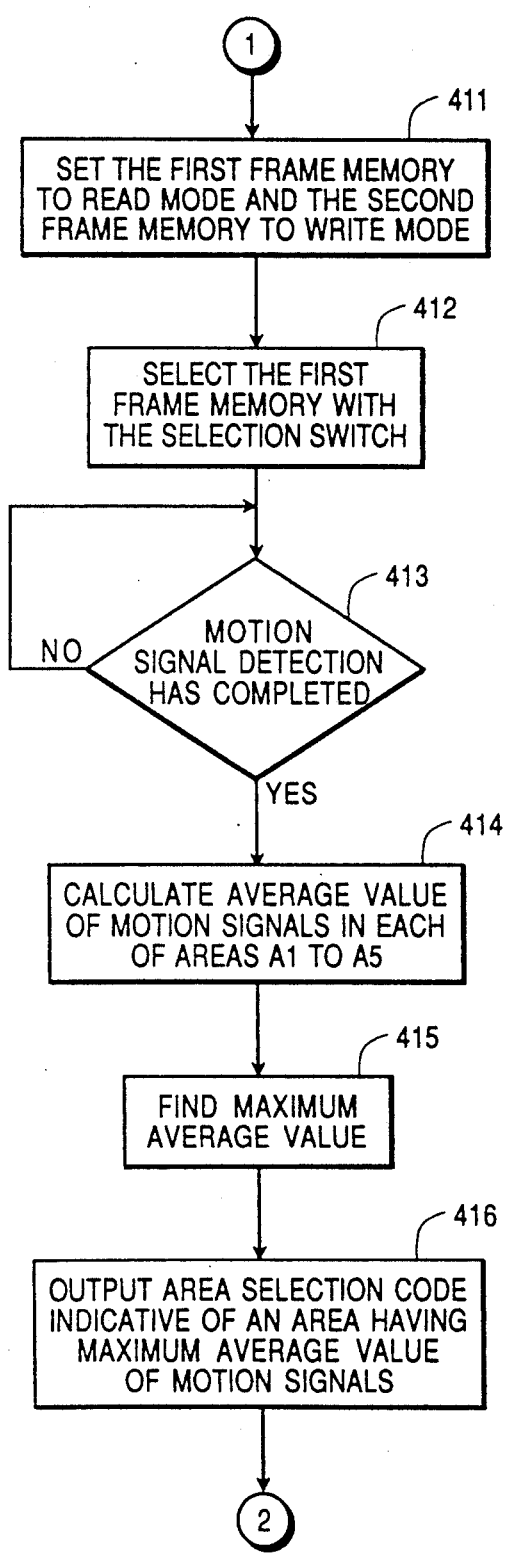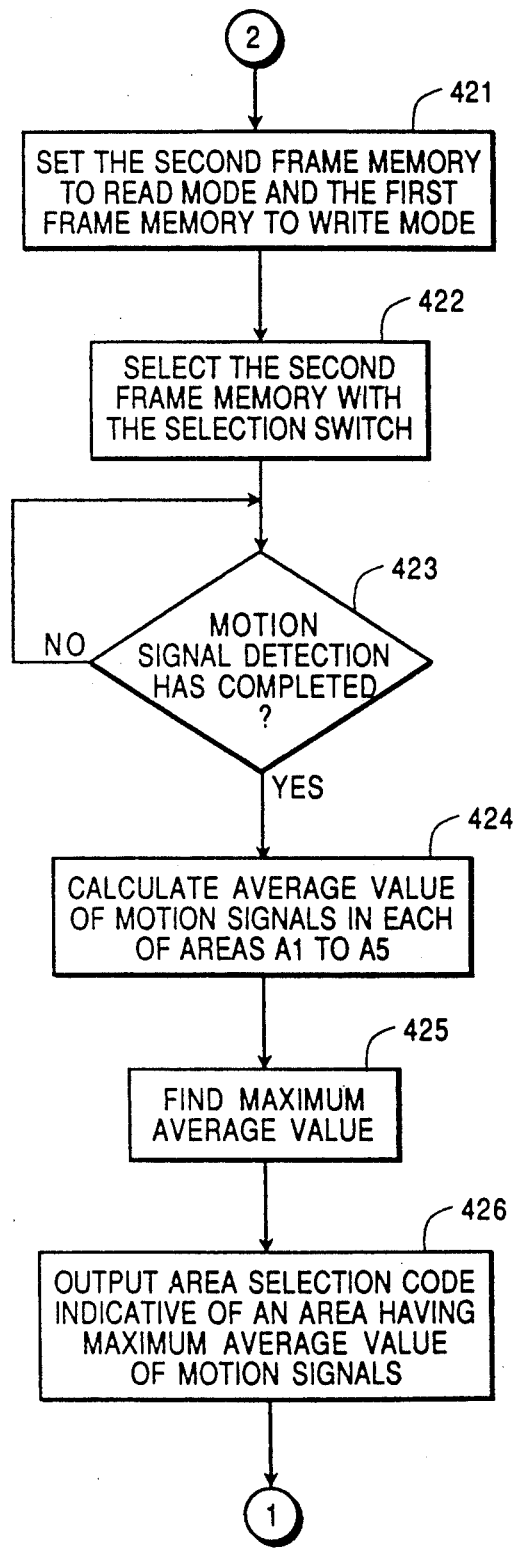

1

APPARATUS UTILIZING MOTION DETECTOR FOR CONVERTING A MAXIMUM MOTION PORTION OF A WIDE SCREEN TV SIGNAL TO A NORMAL SCREEN TV SIGNAL

BACKGROUND OF THE INVENTION

1. Field of the Invention

The present invention relates to an apparatus for converting a wide screen television signal to a normal screen television signal. The "normal screen television signal" is defined here as a television signal which produces a television picture of a normal aspect ratio (for example, the existing 4:3 aspect ratio) displayed on a screen having such a normal aspect ratio, such as the existing NTSC, PAL and SECAM signals. The "wide screen television signal" is defined here as a television signal which produces a television picture of a wider aspect ratio than the normal aspect ratio, such a television picture being displayed on a screen having a wider aspect ratio than the normal aspect ratio, such as the recently developed HDTV signal.

2. Description of the Prior Art

Recently, various types of HDTV (High Definition Television) systems have been developed to provide a higher quality television picture than that of the existing television systems. The HDTV system is designed to use a television screen having a wider aspect ratio than the existing 4:3 aspect ratio. In other words, the HDTV television signals are the above-mentioned wide screen television signals. On the other hand, since there is widespread consumer use of television sets which are designed for the existing television systems, there is a substantial demand for a system which can convert a wide screen television signal to a normal screen television signal so that the wide screen television signal can be utilized by an existing television set.

To answer this demand, a system for converting the MUSE signal to the NTSC signal has been disclosed in Television Technology, published in October 1989 in Japan. This system is schematically shown in FIGS. 1(A) and 1(B). In the MUSE system, the aspect ratio is 16:9, the number of scanning lines is 1125, and the field frequency is 60 Hz. Referring to FIG. 1(A), the MUSE signal having the 16:9 aspect ratio is converted to the NTSC signal having the 4:3 aspect ratio, or more specifically, a part of the MUSE picture is extracted so that the aspect ratio of the extracted part becomes 4:3. Three parts to be extracted are predetermined: a left part L, the center part C and the right part R. One of the three parts can be selected by a viewer according to the viewer's preference. FIG. 1(B) shows a main part of the system in which the MUSE-to-NTSC conversion is made by a random access memory (RAM) 1 which is controlled by write and read clocks having different frequencies from each other. A write address counter 2 is responsive to the write clock (16.2 MHz) for writing the MUSE signal into the RAM 1. A read address counter 3 is responsive to the read clock (5.04 MHz) for reading out the signal stored in the RAM 1 to obtain a time-axis converted signal, which is the NTSC signal. The write clock is applied to the RAM 1 through a gate 4 which is controlled by a window signal so that the MUSE signal is written into the RAM 1 only at the portion corresponding to the 4:3 aspect ratio. The timing of the active period of the window signal is preset by, for example, using a manual selection switch operated by a viewer according to the viewer's preference. That is, when the viewer wishes to watch the left part L of the MUSE picture the viewer may select the left part L by operating the manual selection switch.

In the above system, however, the selection of the extracting area is made by a viewer. The viewer may find troublesome the operation of the manual selection switch even if the viewer wishes to change the part to be displayed on the NTSC television screen.

SUMMARY OF THE INVENTION

Accordingly, it is an object of the present invention to provide an apparatus for converting a wide screen television signal to a normal screen television signal which automatically selects an area to be extracted from the wide screen television signal according to an appropriate manner of selection.

An apparatus for converting a wide screen television signal to a normal screen television signal according to the present invention includes an extracting unit for selectively extracting a part of the wide screen television signal corresponding to a normal screen television picture to obtain the normal television signal, a motion detecting means for detecting a motion of the picture produced by the wide television signal, and a control means for controlling the extracting means so as to extract the part from the wide television signal according to a detection result by the motion detecting means.

In a preferred embodiment, a plurality of areas to be extracted from the wide screen television picture are predetermined. The motion detecting unit detects from among the plurality of areas an area in which the motion of the picture is the greatest. The control unit controls the extracting unit so that a part of the wide television signal corresponding to the area in which the motion of the picture is the greatest is extracted by the extracting unit. In general, the most interesting portion of a television picture is that portion in which there is the greatest amount of motion within the picture. Accordingly, the apparatus of the present invention provides a displayed television picture which is suited to a viewer's usual preference.

BRIEF DESCRIPTION OF THE DRAWINGS

The above and other features of the present invention will be more apparent from the following description taken in connection with the accompanying drawings in which:

FIG. 3 is a diagram showing a plurality of predetermined areas to be extracted from a wide screen television picture in the embodiment of FIG. 2;

FIGS. 5(A) and (B) are a flow chart showing a control operation executed by a microprocessor used in the motion detector shown in FIG. 4; and FIG. 6 is a diagram showing a reduced area for detecting the motion of a picture.

DESCRIPTION OF THE PREFERRED EMBODIMENTS

Figure 1A:
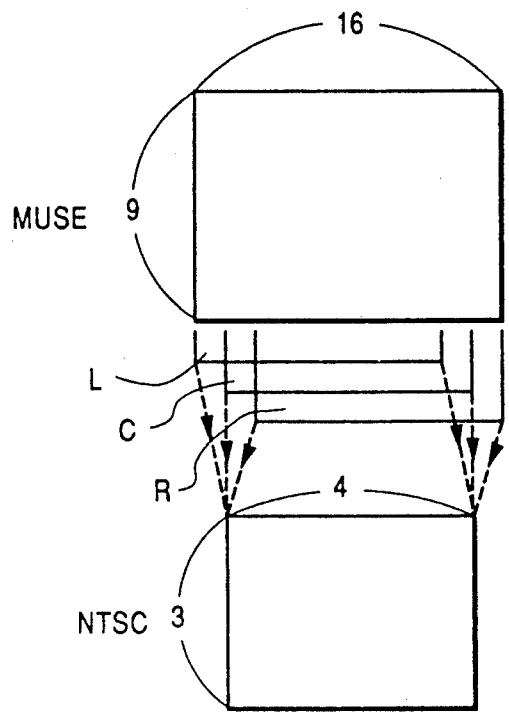
FIG. 1(A) is a diagram showing a conventional conversion from the MUSE signal to the NTSC signal.
Figure 1B:
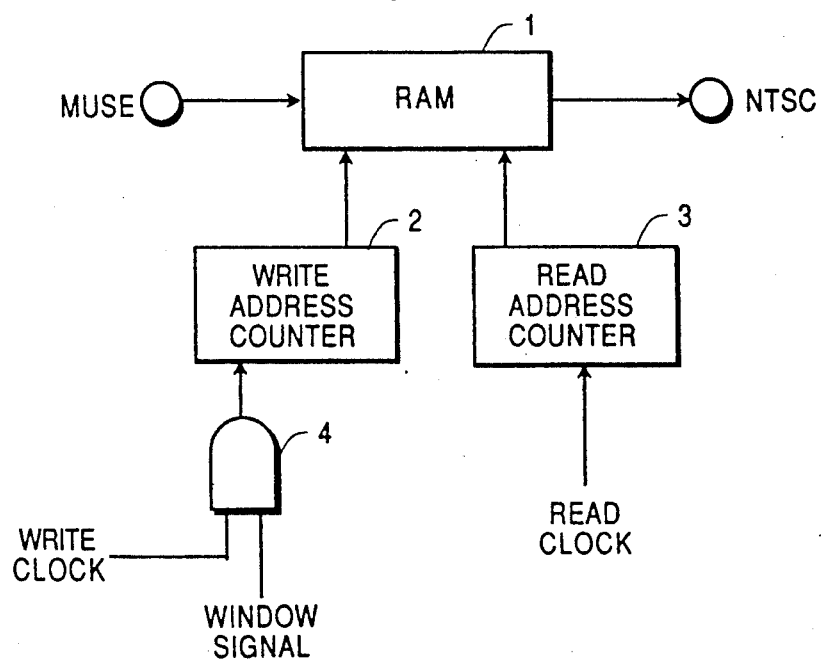
FIG. 1(B) is a block diagram showing a conventional system for realizing the conversion shown in FIG. 1(A)
Figure 2:
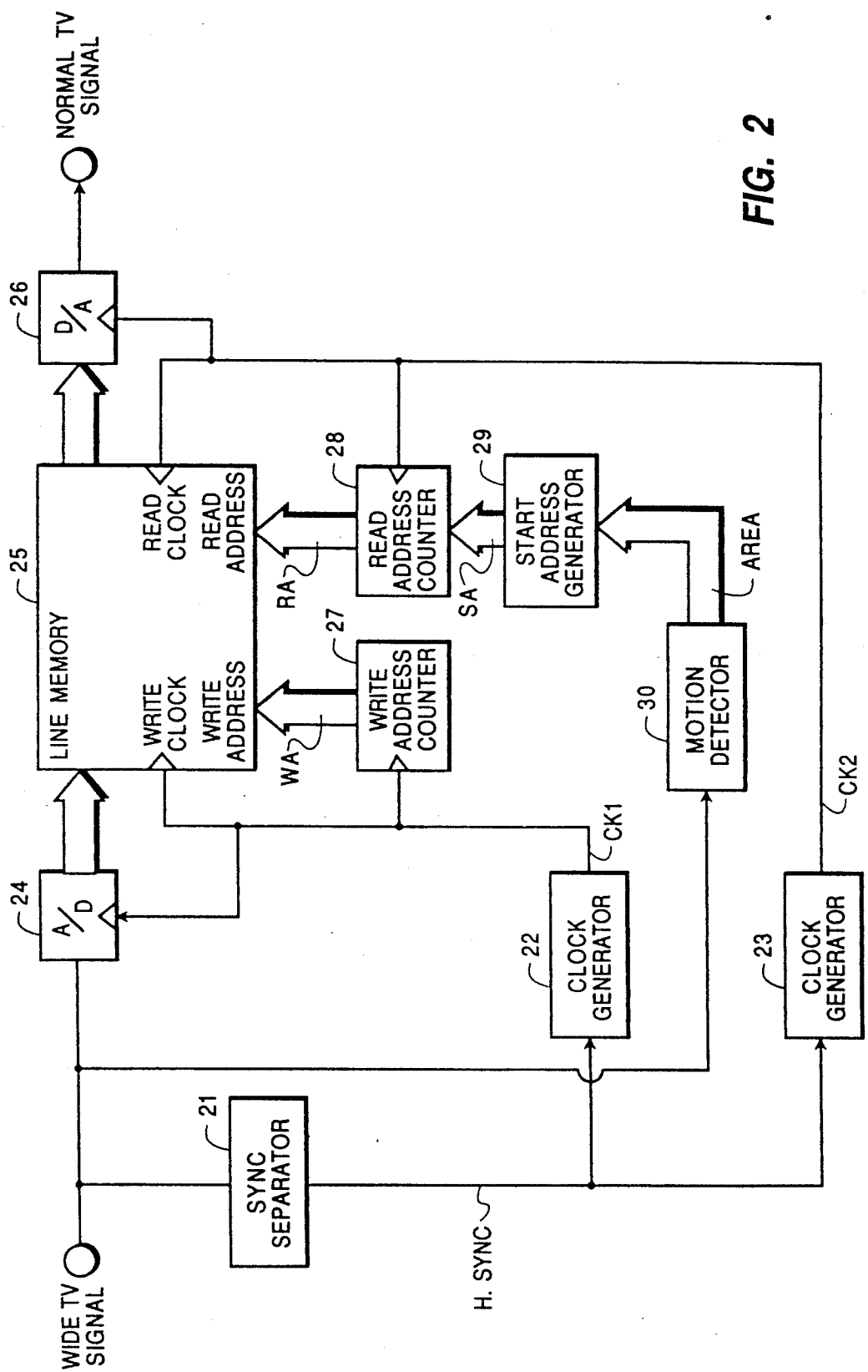
FIG. 2 is a block diagram showing an apparatus for converting a wide screen television signal to a normal screen television signal as an embodiment of the present invention.

FIG. 2 shows an apparatus for converting a wide screen television signal to a normal screen television signal as an embodiment of the present invention. The input wide screen television signal produces a television picture having an aspect ratio of 5:3. The output normal screen television signal produces a television picture having an aspect ratio of 4:3. As shown in FIG. 3, within the wide screen television picture having the 5:3 aspect ratio, five different areas A1 to A5 (indicated by the hatching in FIG. 3) each having the 4:3 aspect ratio are predesignated. One of the areas A1 to A5 will be extracted as the normal screen television picture of the 4:3 aspect ratio to be displayed.

Referring to FIG. 2, a sync separator 21 separates a horizontal sync signal from the input wide screen television signal. A clock generator 22 produces a first clock signal CK1 (17.6 MHz) from the horizontal sync signal. Another clock generator 23 produces a second clock signal CK2 (14.3 MHz) from the horizontal sync signal. An analog to digital converter (A/D) 24 is responsive to the first clock signal CK1 for sampling and converting the input analog wide screen television signal to a digital wide screen television signal. The output signal of the A/D converter 24 is sequentially written into a line memory 25 which has a memory capacity sufficient for storing all samples of the digital wide screen television signal in one horizontal line. For the writing operation of the memory 25, the memory 25 receives at its write clock terminal the first clock signal CK1 and at its write address port a write address WA generated by a write address counter 27. The write address counter 27 counts up in response to the first clock signal CK1.

The samples stored in the line memory 25 are read out by applying the second clock signal CK2 to a read clock terminal of the memory 25 and by applying a read address RA to a read address port of the memory 25. Since the reading rate in response to the second clock signal CK2 (14.3 MHz) is lower than the writing rate in response to the first clock signal CK1 (17.6 MHz), the number of the read out samples is smaller than the number of the written samples in one line of the wide screen television signal. More specifically, the number of samples read out from the memory 25 is 4/5 times the number of the samples of the wide screen television signal written in. In other words, the signal read out from the memory 25 corresponds to the normal screen television signal. The output signals from the line memory 25 is converted to an analog normal screen television signal by a digital to analog converter (D/A) 26 which is responsive to the second clock signal CK2.

The read address RA is generated by a read address counter 28 which counts up from a start address SA set at its preset terminal in response to the second clock signal CK2. The selection of an area (one of the areas A1 to A5 shown in FIG. 3) to be extracted can be effected by changing the start address SA applied to the preset terminal of the read address counter 28. The start address SA is generated by a start address generator 29 according to an area selection code AREA outputted from a motion detector 30. The area selection code AREA is indicative of a selected one of the areas A1 to A5. The start address generator 29 may be a read only memory which has stored therein predetermined start addresses corresponding to the areas A1 to A5, respectively, and which receives the area selection code AREA as an address signal thereof for outputting one of the stored start addresses SA according to the area selection code AREA.

The motion detector 30 detects the motion of the picture produced by the input wide screen television signal in each of the areas A1 to A5, and outputs the area selection code AREA indicative of an area in which the motion of the picture satisfies a most desired condition. The desired condition may be predetermined arbitrarily. One preferred condition may be that in which the motion of the picture is the means largest. That is, the motion detector 30 may output an area selection code AREA indicative of an area in which the motion of the picture is the largest among the five areas A1 to A5.

Figure 4:
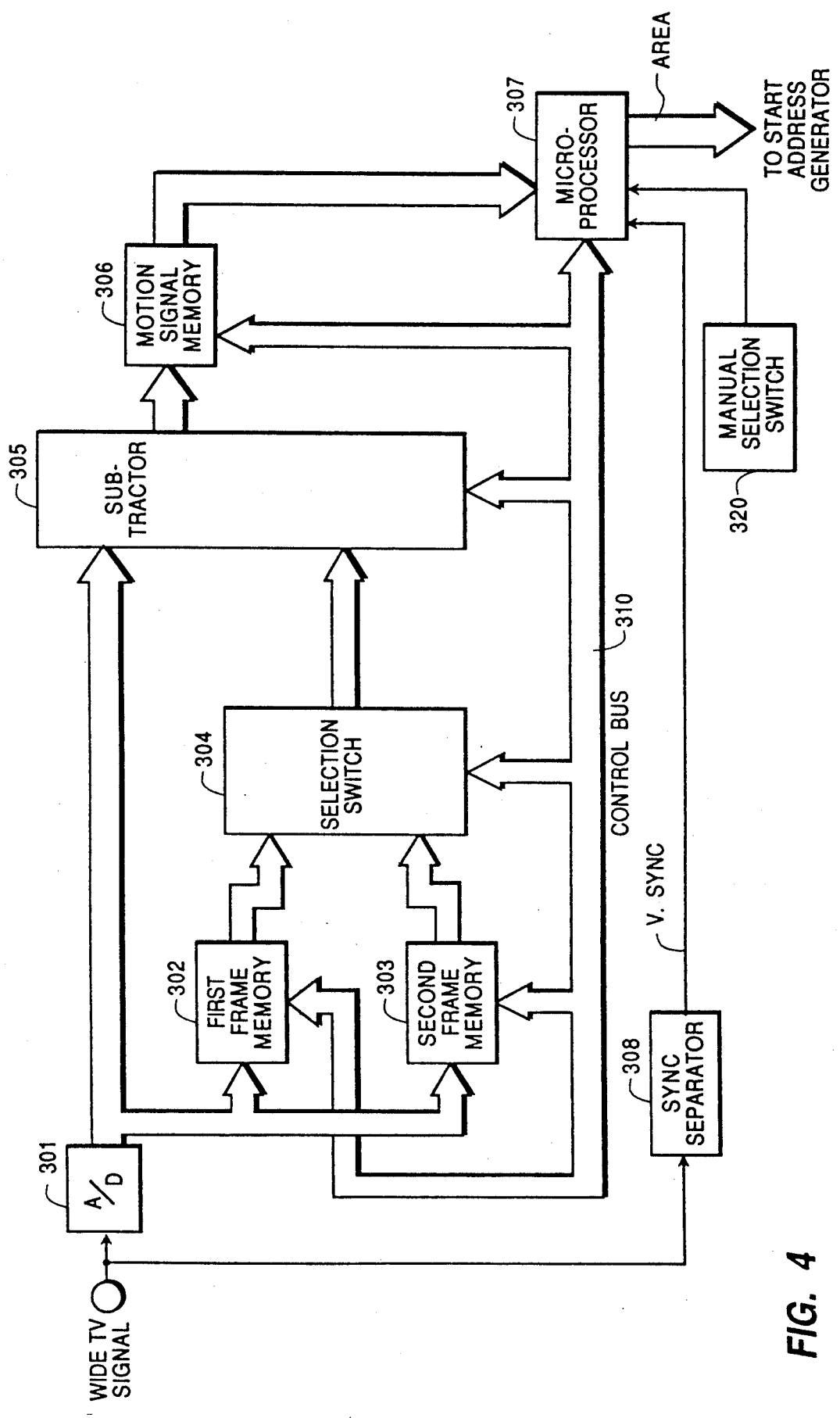
FIG. 4 is a block diagram showing an example of a motion detector used in the apparatus shown in FIG. 2.

FIG. 4 shows an example of the motion detector 30. The motion detector shown in FIG. 4 detects the motion of the picture produced by the input wide screen television signal in each of the areas A1 to A5, and outputs the area selection code AREA indicative of an area in which the motion of the picture is the largest among the five areas A1 to A5. The input analog wide screen television signal is sampled and converted to a digital wide screen television signal by an analog to digital converter (A/D) 301. The digital wide screen television signal from the A/D converter 301 is stored into a first frame memory 302 and a second frame memory 303 alternately on a frame-by-frame basis. The digital wide screen television signal from the A/D converter 301 is stored into one of the first and second frame memories 302 and 303 as above, and at the same time is supplied to a subtracter 305. Output terminals of the first and second frame memories 302 and 303 are selectively connected to the subtracter 305 by a selection switch 304 which changes the connection of one of the two frame memories 302, 303 to the subtracter 305 to the other of the two frame memories at frame intervals. More specifically, the selection switch 304 connects the output of one of the first and second frame memories which is not in the write operation, or which has stored therein the digital wide screen television signal of the previous frame. Accordingly, the subtracter 305 subtracts the digital wide screen television signal in the previous frame (stored in the frame memory whose output is connected to the subtracter 305 through the selection switch 304) from the digital wide screen television signal in the current frame (supplied to the subtracter 305 directly from the A/D converter 301) on a pixel by pixel basis (on a sample by sample basis) to obtain motion signals each indicating a motion of a corresponding pixel (sampled data). The motion signals calculated by and outputted from the subtracter 305 are sequentially stored into a motion signal memory 306. The motion signal memory 306 can store the motion signals of all of the pixels on the wide screen television picture. A microprocessor 307 controls the frame memories 302, 303, the selection switch 304, the subtracter 305 and the motion signal memory 306 through a control bus 310. Also, the microprocessor 307 calculates, based on the motion signals stored in the motion signal memory 306, an average value of the motion signals in each of the areas A1 to A5, recognizes the largest average value of the motion signals, and outputs an area selection signal AREA indicative of an area in which the average value of the motion signals is the largest. A sync separator 308 separates from the input wide screen television signal a vertical sync signal, which is inputted into the microprocessor 307 for synchronization control.

The control operation executed by the microprocessor 307 will be described in more detail with reference to the flow chart shown in FIGS. 5(A) and (B).

Suppose that the first frame memory 302 has stored therein the digital wide screen television signal in the previous frame.

The microprocessor 307 sets the first frame memory 302 to the read operation mode and the second frame memory 303 to the write operation mode (step 411), and controls the selection switch 304 to select the first frame memory 302 so that the output of the first frame memory is connected to the subtracter 305 (step 412). Thus, the digital wide screen television signal outputted from the A/D converter 301 is written into the second frame memory 303, and at the same time is supplied to the subtracter 305. The digital wide screen television signal in the previous frame having been stored in the first frame memory 302 is read out, and supplied to the subtracter 305 through the selection switch 304. The subtracter 305 subtracts, on a pixel by pixel basis, the digital wide screen television signal in the previous frame supplied from the first frame memory 302 through the selection switch 304 from the digital wide screen television signal in the current frame supplied directly from the A/D converter 301 to obtain the motion signals of the respective pixels. The motion signals calculated by the subtracter 305 are sequentially stored into the motion signal memory 306. The microprocessor 307 waits until the calculation of the motion signals is completed for all of the pixels in the current frame (step 413).

When the motion signal calculation in one frame has been completed, the microprocessor 307 calculates, based the motion signals stored in the motion signal memory 306, an average value of the motion signals in each of the areas A1 to A5 (step 414). The average value calculation may be started during the step 413 immediately after the subtraction calculation by the subtracter 305 has started in order to save time consumed by the average value calculation.

After the average value calculation has been completed, the microprocessor 307 finds the maximum average value from among the average values of the motion signals of the five areas A1 to A5 (step 415). The area in which the average value of the motion signals is the maximum is the area to be extracted as the normal screen television picture. Then, the microprocessor 307 outputs an area selection code AREA indicative of the area having the maximum average value of the motion signals (step 416). The area selection code AREA is sent to the start address generator 29 where it is converted to the start address SA to be fed to the preset terminal of the read address counter 28.

Thereafter, the microprocessor 307 sets the first frame memory 302 to the write operation mode and the second frame memory 303 to the read operation mode (step 422). Thus, the digital wide screen television signal outputted from the A/D converter 301 is written into the first frame memory 302, and at the same time is supplied to the subtracter 305. The digital screen wide screen television signal in the previous frame having been stored in the second frame memory 303 is read out, and supplied to the subtracter 305 through the selection switch 304. The subtracter 305 subtracts, on a pixel by pixel basis, the digital wide screen television signal in the previous frame supplied from second frame memory 303 through the selection switch 304 from the digital wide screen television signal in the current frame supplied directly from the A/D converter 301 to obtain the motion signals of the respective pixels. The motion signals calculated by the subtracter 305 are sequentially stored into the motion signal memory 306. The microprocessor 307 waits until the calculation of the motion signals is completed for all of the pixels in the current frame (step 423).

When the motion signal calculation in one frame has been completed, the microprocessor 307 calculates, based the motion signals stored in the motion signal memory 306, an average value of the motion signals in each of the areas A1 to A5 (step 424). The average value calculation may be started during the step 423 immediately after the subtraction calculation by the subtracter 305 has started in order to save time consumed by the average value calculation.

After the average value calculation has been completed, the microprocessor 307 finds the maximum average value from among the average values of the motion signals of the five areas A1 to A5 (step 425). The area in which the average value of the motion signals is the maximum is the area to be extracted as the normal screen television picture. Then, the microprocessor 307 outputs an area selection code AREA indicative of the area having the maximum average value of the motion signals (step 426). The area selection code AREA is sent to the start address generator 29 where it is converted to the start address SA to be fed to the preset terminal of the read address counter 28. Then, the control operation of the microprocessor 307 returns to the step 412.

Referring back to FIG. 4, a manual selection switch 320 is connected to the microprocessor 307. The manual selection switch 320 is operated by a viewer to select one of a first control operation mode in which the microprocessor 307 outputs the area selection code AREA according to the motion signal detection result as described above, and a second control operation mode in which the microprocessor outputs a fixed area selection code regardless of the motion signal detection result. In the second control operation mode, it is preferable that the microprocessor 307 outputs, as the fixed area selection code, the area selection code indicative of the center area (A3 in FIG. 3).

To reduce the memory size and the calculation time of the motion detector, the motion signal detection may be carried out for a portion of the entire wide screen television picture as shown, for example, in FIG. 6. Referring to FIG. 6, only the center portion in the vertical direction (indicated by the hatching in FIG. 6) is used for the motion detection. The average value of the motion signals is calculated in each of the center portions A1' to A5' of the areas A1 to A5. With this modification, each of the frame memories 302 and 303 may be replaced with a memory having an significantly reduced memory size as compared with the frame memories. Also, the size of the motion signal memory 306 can be significantly reduced.

We claim:

1. An apparatus for converting a wide screen television signal for producing a wide screen television picture having a larger aspect ratio than a normal aspect ratio of a normal screen television picture into a normal screen television signal for producing a desired normal screen television picture, comprising:

extracting means for selectively extracting from the wide screen television signal a portion of the wide screen television signal which corresponds to the normal screen television picture to thereby obtain the desired normal screen television signal;

motion detecting means for detecting a motion of the wide screen television picture produced by the wide screen television signal; and control means for controlling the extracting means to extract the portion of the wide screen television signal according to a motion detection result of the motion detecting means.

2. An apparatus according to claim 1, wherein the motion detecting means detects, from among a predetermined plurality of areas of the wide screen television picture each having the normal aspect ratio, an area in which the motion of the wide screen television picture is the largest and produces an area selection code indicative of the thus detected area, and wherein the control means is responsive to the area selection code for controlling the extracting means to extract the portion of the wide screen television signal corresponding to the area indicated by the area selection code.

3. An apparatus according to claim 2, wherein said control means includes control selection means for selecting a first control operation mode in which the control means controls the extracting means responsive to the area selection code and a second control operation mode in which the control means controls the extracting means according to a predetermined one of the plurality of areas independently of the area selection code.

* * * * *